April 13, 1954   J. E. WEILER   2,675,302
PRODUCTION OF ANHYDROUS HYDRAZINE
Filed Nov. 8, 1947   3 Sheets-Sheet 1
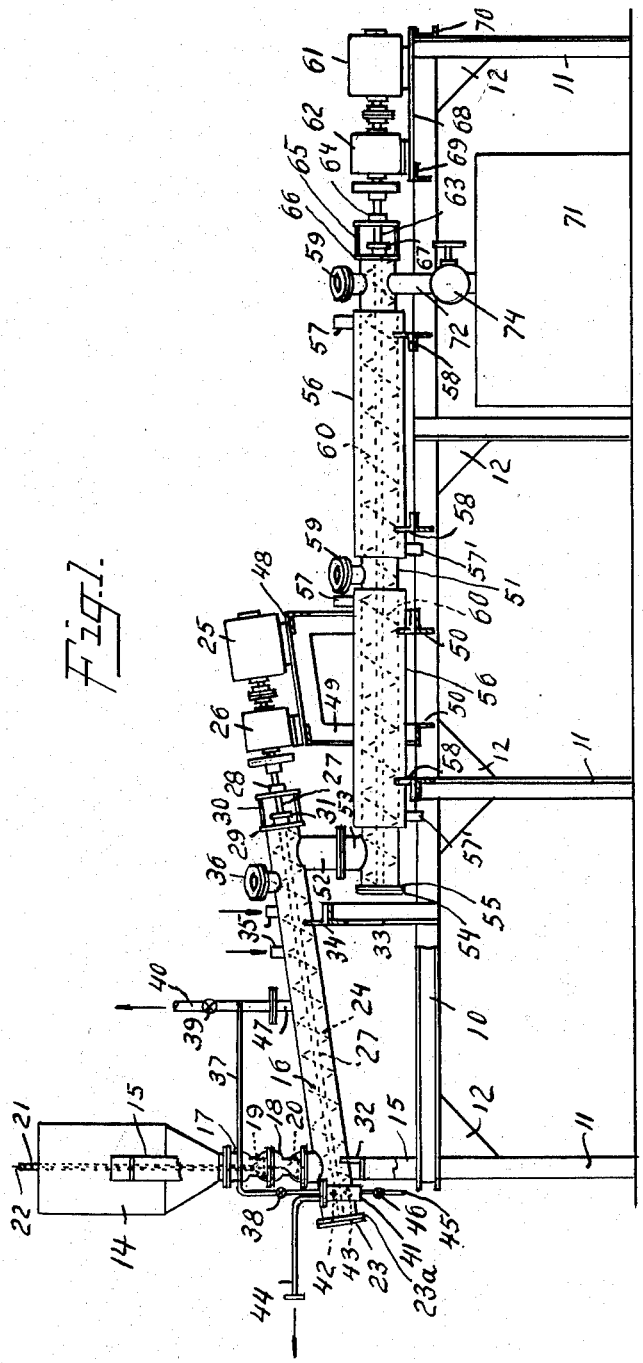
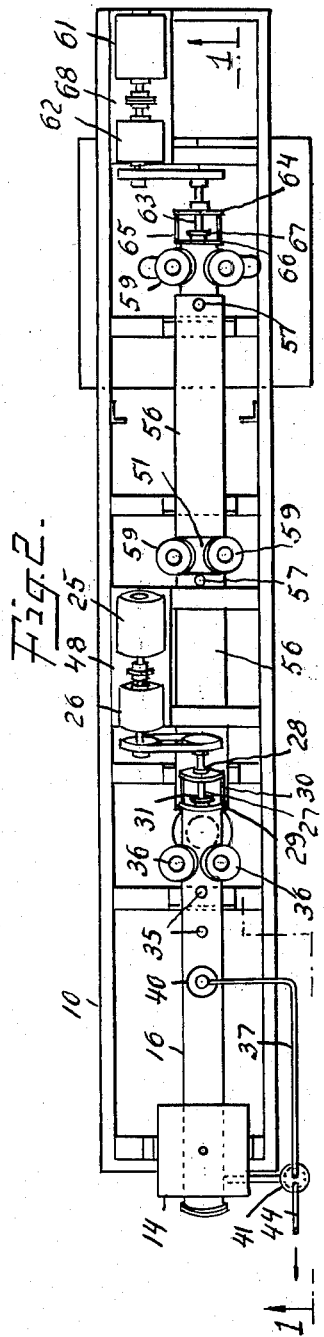
INVENTOR
JOHN E. WEILER
BY
Pennie, Edmonds, Morton and Barrows
ATTORNEYS April 13, 1954  J. E. WEILER  2,675,302
PRODUCTION OF ANHYDROUS HYDRAZINE
Filed Nov. 8, 1947  3 Sheets-Sheet 2

INVENTOR
JOHN E. WEILER
BY
Pennie, Edmonds, Morton and Barrows
ATTORNEYS

April 13, 1954

J. E. WEILER 2,675,302

PRODUCTION OF ANHYDROUS HYDRAZINE

Filed Nov. 8, 1947

INVENTOR
JOHN E. WEILER
BY
Pennie, Edmonds, Morton and Barrows
ATTORNEYS

Patented Apr. 13, 1954

2,675,302

UNITED STATES PATENT OFFICE 2,675,302

PRODUCTION OF ANHYDROUS HYDRAZINE

John E. Weiler, Niagara Falls, N. Y., assignor to Mathieson Chemical Corporation, a corporation of Virginia Application November 8, 1947, Serial No. 784,809

2 Claims. (Cl. 23—190)

My invention relates to the production of anhydrous hydrazine from hydrazine sulfates and embraces both a process and a system of apparatus.

Heretofore, anhydrous hydrazine has been generally prepared from aqueous hydrazine through the use of dehydrating agents, such as caustic soda, barium oxide, and the like. This method is disadvantageous because of the high heat requirements and because of the loss of product through decomposition. Also, it is not an operation which can be characterized as safe.

The process of the invention involves the following series of operations:

1. The introduction of a hydrazine sulfate into an excess of liquid ammonia.
2. The separation of the resulting liquid ammonia-hydrazine solution from the solid ammonium sulfate-ammonia complex.
3. Washing of the complex with liquid ammonia to free it of hydrazine.
4. Separation of the wash liquor from the essentially hydrazine-free complex.
5. Drying of the complex wet with liquid ammonia to free it of ammonia.
6. Decomposition of the complex with production of ammonia for reuse after liquefaction in step 1.

The process, which is continuous, takes full advantage of the fact that of the two starting materials one is a solid and one is a liquid and that the same obtains in the case of the two product materials. As preferably executed, the recited steps are achieved in a novel system of apparatus, hereinafter described and claimed, comprising a reactor-washer in which the solid material, initially consisting entirely of hydrazine sulfate, is caused to move against a stream of hydrazine-liquid ammonia solution which becomes progressively less concentrated in hydrazine or, conversely, progressively more concentrated in liquid ammonia. It is a feature of my process, as preferably executed, that the amount of ammonia required to be recirculated is substantially less than that required in the case of a batch operation.

The detailed description of my invention will proceed with reference to the accompanying drawings in which Figure 1 is a section in elevation of my new system of apparatus;

Figure 2 is a plan view thereof;

Figure 3:
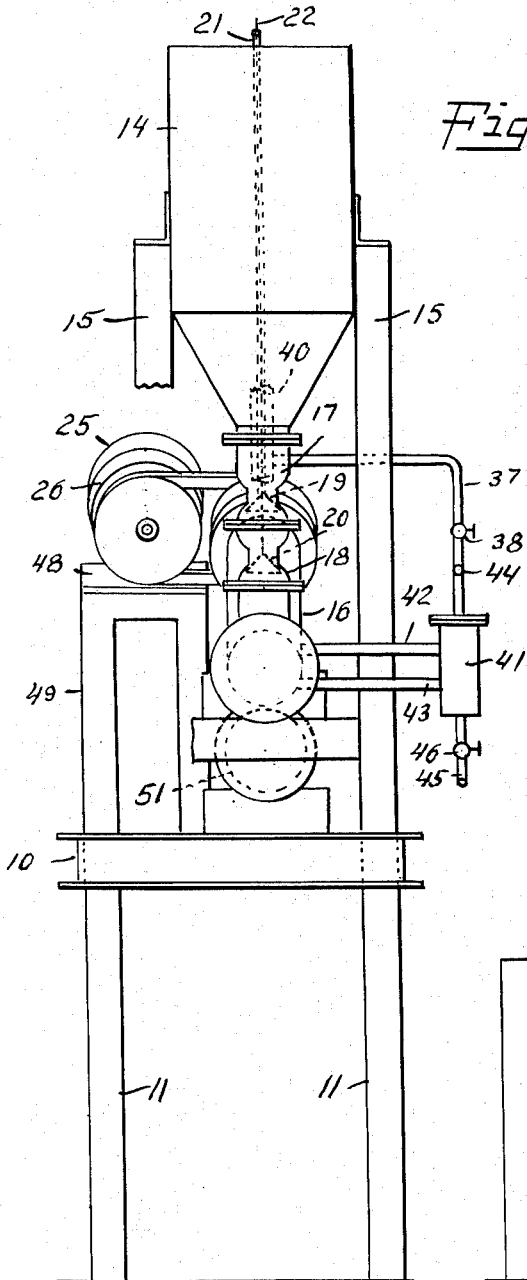
Figures 3 and 4 are end views of the apparatus as shown in Figure 2, Figure 3, in which certain parts are broken away, being taken from the left end, Figure 4 from the right end

Referring now to Figures 1 and 2, particularly to Figure 1, the apparatus will be seen as mounted on a frame member 10 supported on legs 11 having braces 12. A feed bin or hopper 14 for hydrazine sulfate is supported by standards 15, one of which in the drawings (see Figure 3) is represented as integral with one of the legs 11. A cylinder 16, to which the hydrazine sulfate is charged, communicates with hopper 14 through a neck formed by flanged sections 17 and 18, the flow being controlled by closures 19 and 20 having telescoping stems 21 and 22 which may be actuated either manually or automatically. The valve arrangement, as will be readily understood, permits of introduction of hydrazine sulfate into the cylinder 16 from the hopper 14 without disruption of the seal therebetween.

In the preferred construction, frame member 10 is at floor level; otherwise it should support a catwalk, not shown. Cylinder 16 will be noted as closed at its lower end by a cover plate 23 which may be secured by bolts or in any other suitable way to flange 23a. Within the cylinder the hydrazine sulfate is propelled by a screw 24 powered by motor 25 through reduction gears 26, power transmission in the case of the embodiment shown in the drawings being by belt and pulley. Screw shaft 27 is journalled in a bearing 28 supported from flange 29 through extensions 30. A sealing gland 31, which may be of a conventional type, is bolted or otherwise suitably secured to flange 29.

At its lower end, cylinder 16 is shown as supported by a cross member 32 connecting standards 15, while at its upper end it is shown as supported by standards or arms 33 joined at their upper ends by a cross member 34 which may be cut to conform with the contour of that part of the cylinder resting thereon. In use of the apparatus pipes for introducing liquified ammonia are coupled to connections 35.

Cylinder 16 is advantageously provided with inspection ports 36 and with a pressure-equalizing pipe 37 controlled by valve 38, extending from pipe 40, under control of valve 39 and providing exit for ammonia gas, to trap 41. Trap 41 communicates with cylinder 16 via pipes 42 and 43 (see Figure 3) and is supported thereby. Pipe 44 extending from the cover plate of the trap 41 is adapted to be coupled to a pipe extending to a still for the separation of hydrazine and liquid ammonia, while pipe 45, controlled by valve 46, provides exit to sediment accumulated in the bottom of the trap. Ammonia gas exit line 40 is coupled to connection 47 which may be welded to the upper surface of the cylinder 16 substantially equi-distant with respect to the ends of the cylinder.

Motor 25 and speed reducing gears 26 are mounted on a tilted platform 48 supported on legs 49 secured to cross members 50.

Cylinder 16 discharges into a cylinder 51 with which it communicates via a conduit formed by flanged sections 52 and 53. Cylinder 51 is closed at its lower end by a cover plate 54 secured to a flange 55, welded or otherwise affixed to the end of the cylinder, and is partially covered with heating jackets 56, each provided with connections 57 and 57', to which pipes for the circulation of a heating medium, as steam or hot water, may be coupled. Cylinder 51 is supported on saddles 58 secured to frame member 10 and is advantageously equipped with inspection ports 59 positioned as shown. In the cylinder a screw 60 of suitable pitch is powered, as in the case of the screw in cylinder 16, by an electric motor 61 through reducing gears 62. Power transmission is again shown as being by belt and pulley. Screw shaft 63 is journalled in a bearing 64 supported by extensions 65 from a flange 66 and passes through a packing or sealing gland 67, bolted or otherwise suitably secured to the flange. Flange 66 is advantageously affixed to the end of the cylinder 56 by welding.

Figure 4:
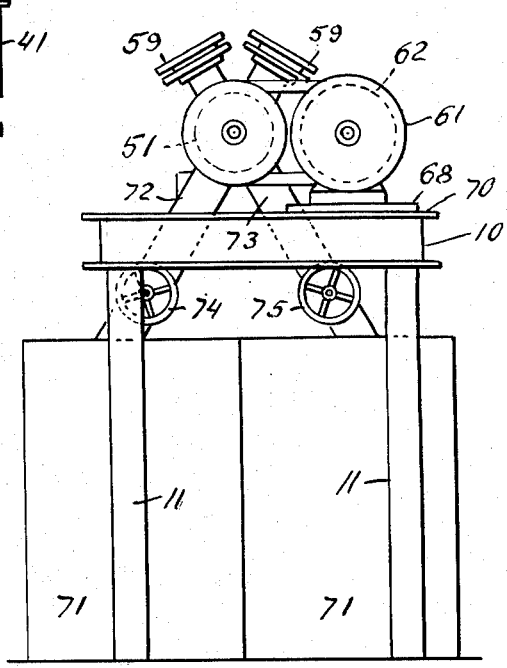

Motor 61 and speed reducing gears 62 are mounted on a platform 68 resting on and secured to cross members 69 and 70, member 70 being a part of frame member 10. Cylinder 51 discharges into a compartmented bin 71 with which it communicates via pipes 72 and 73 controlled by valves 74 and 75, respectively (see Figure 4).

Operation of the apparatus, as employed in the execution of the process herein, will now be described with particular reference to Figure 5 in which parts previously identified are denoted by like numerals.

Dry, pulverulent hydrazine sulfate, charged to cylinder 16 in the manner previously indicated, is slowly moved therethrough by the action of screw 24 against a stream of liquid ammonia introduced through connections 35. The liquid ammonia, which is used in substantial excess, becomes increasingly concentrated in hydrazine as it approaches the lower end of the cylinder. Screw shaft 27 may rotate at a rate of from about 3 to 9 R. P. Hr., giving a residence period in the cylinder 16 of the order of 1 to 2 hours, for example.

A solution of hydrazine in liquid ammonia is continuously or intermittently withdrawn from trap 41 and conveyed via pipe 77, coupled to connection 44 and controlled by valve 78, to an evaporator 79, preferably equipped with trays 80 and a heating element 81. Anhydrous hydrazine, the chiefly desired product of the process, is withdrawn from the evaporator via pipe 82, while ammonia gas is conveyed from the top of the evaporator via pipe 83, controlled by valve 84. Pipe 83 connects with pipe 40, the ammonia gas exit pipe extending from the top of cylinder 16. This pipe leads to a compressor 85 wherein ammonia gas is compressed for liquefaction in condenser 86 which communicates with the compressor via pipe 87. Liquid ammonia is returned to the cylinder 16 through pipes 88 and 89 controlled by valves 90 and 91, respectively. Make-up ammonia may be added as a gas through pipe 92, controlled by valve 93, or as a liquid through pipe 94 controlled by valve 95.

Pressure equalizing pipe 37 extending from pipe 40 to trap 41 serves to prevent accumulation of ammonia gas above the liquid in the trap and consequent complications. Pipe 45, depending from the trap, should be periodically opened to remove any solid material carried into the trap from the cylinder 16.

The reaction between the hydrazine sulfate and liquid ammonia giving hydrazine is immediate, the relatively long residence period in the cylinder 16 being necessary in order to insure substantially complete removal of the hydrazine from the ammonium sulfate-ammonia complex by the washing action of the liquid ammonia and to allow for drainage of the complex. It is to be observed that the greater the contamination of the complex with hydrazine, the less the concentration of hydrazine in the liquid ammonia. This is manifestly highly undesirable from the standpoint of maximum hydrazine recovery.

Figure 5:
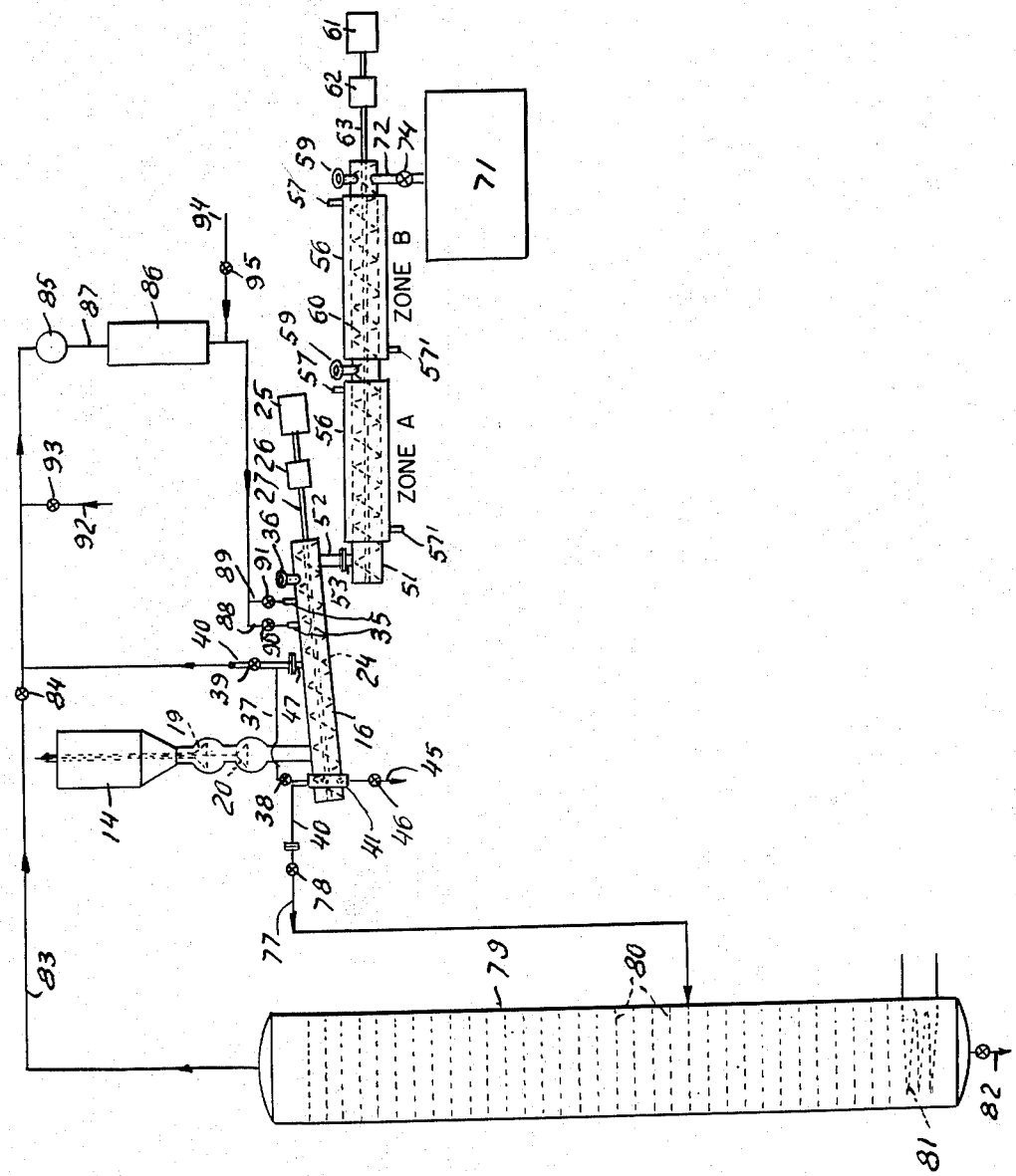
Figure 5 is a simplified diagrammatical representation illustrative of my process as carried out using the novel apparatus.

The complex, wet with ammonia, and essentially free of hydrazine is dumped into cylinder 51 wherein it is first dried to a powder and then decomposed to ammonia and ammonium sulfate, the drying taking place in the first section of the cylinder, legended "Zone A" in Figure 5, and the decomposition taking place in the second section, legended "Zone B." The gaseous ammonia resulting on the decomposition exits via pipe 40 coupled to connection 47 of cylinder 16 and during its passage through Zone A, it materially assists in the drying of the wet complex. Where steam is employed as the heating medium in the jackets 56, it is introduced into the jackets through connections 57, pipes for withdrawal of condensate being coupled to connections 57'. On the other hand, if hot water is employed the water should be introduced through connections 57', connections 57 in this case being coupled to pipes extending to the hot water boiler. The rate of rotation of screw shaft 63 is, of course, dependent on the rate of rotation of screw shaft 27. Ammonium sulfate, the by-product of the process, is collected in bin 71.

As will be immediately seen, the several steps constituting my process can be readily carried out in apparatus other than that disclosed, but this apparatus eliminates handling of potentially dangerous and irritating chemicals while still enabling accomplishment of the steps in an expeditious manner and is for that reason, among others, much to be preferred.

Using the disclosed apparatus the process may be executed at substantially atmospheric pressure. In a typical operation extending over a twenty-four hour period about 900 pounds of the hydrazine sulfate and 1200 pounds of liquid ammonia are charged to the reactor-washer, unit 16 in the drawings. This gives a total of about 1300 pounds of complex charged to the dryer-decomposer and a total of about 935 pounds of by-product ammonium sulfate. Substantially all of the hydrazine is recovered. The solution conveyed to the evaporating tower contains about 1 part of hydrazine for each 3 parts of liquid ammonia.

The process herein may be carried out at subatmospheric or superatmospheric pressures and in the apparatus disclosed where suitable seals are provided.

It should also be noted, that hydrazine normal sulfate $(N_2H_4)_2 \cdot H_2SO_4$, as well as the full sulfate is amenable to the invention and that no limitation to the full sulfate is intended in the appended claims.

I claim:

1. Process according to which a hydrazine sulfate is admixed with a liquid ammonia solution of hydrazine, the hydrazine concentration of the solution being thereby increased and an ammonium sulfate-ammonia complex formed; the solution is separated from the complex and the hydrazine is recovered therefrom by evaporation of ammonia; the complex is washed with liquid ammonia until free of hydrazine; the complex is dried and decomposed by heating to form ammonium sulfate and ammonia gas and which is further characterized in that the liquid ammonia solution of hydrazine into which the hydrazine sulfate is introduced represents the wash liquor from the complex-washing step.

2. Process according to claim 1 where the ammonia evaporated from the solution and the ammonia resulting on the decomposition of the complex is liquefied and reemployed in the washing of the complex.

References Cited in the file of this patent

UNITED STATES PATENTS

| Number | Name | Date |
|---|---|---|
| 1,264,514 | Heckenbleikner | Apr. 30, 1918 |
| 1,694,361 | Sterling | Dec. 4, 1928 |
| 1,735,392 | Hiller | Nov. 12, 1929 |
| 1,920,499 | Flumerfelt | Aug. 1, 1933 |
| 1,959,503 | Seuffert et al. | May 22, 1934 |
| 2,269,898 | Anderson | Jan. 13, 1942 |
| 2,331,910 | Holly | Oct. 19, 1943 |

OTHER REFERENCES

Systematic Inorganic Chemistry, Yost and Russell, 1944 Ed., page 116, Prentice-Hall, Inc., N. Y.

Mellor's: "A Comprehensive Treatise on Inorganic and Theoretical Chemistry," vol. 8, page 325, Longmans, Green and Co., N. Y.